April 13, 1926.

H. ENARD 1,580,556

LOADING AND UNLOADING APPARATUS

Filed Dec. 14, 1922

INVENTOR

April 13, 1926. 1,580,556

H. ENARD
LOADING AND UNLOADING APPARATUS
Filed Dec. 14, 1922    5 Sheets-Sheet 2

INVENTOR
Hans Enard

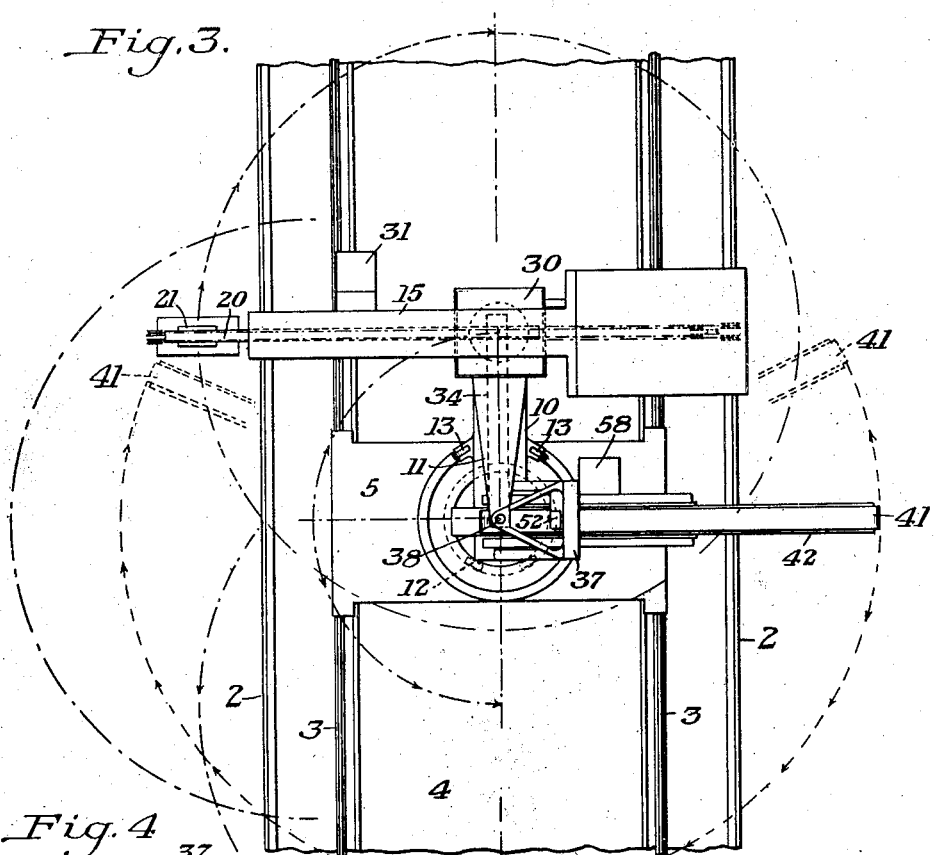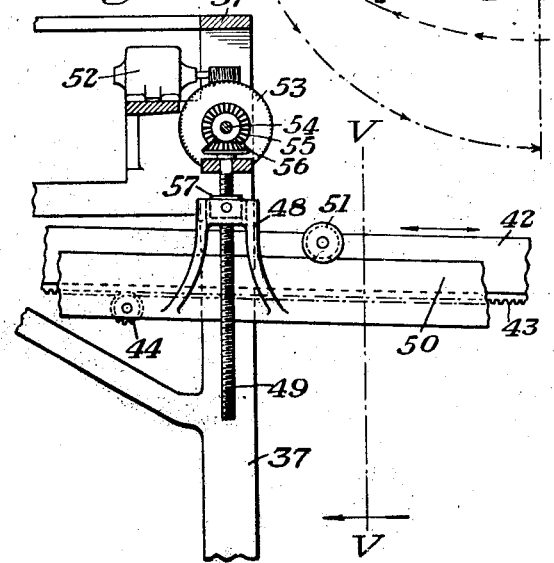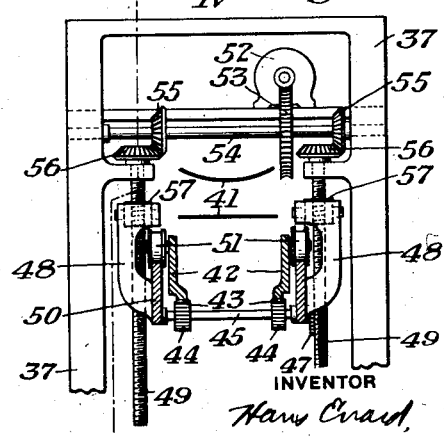

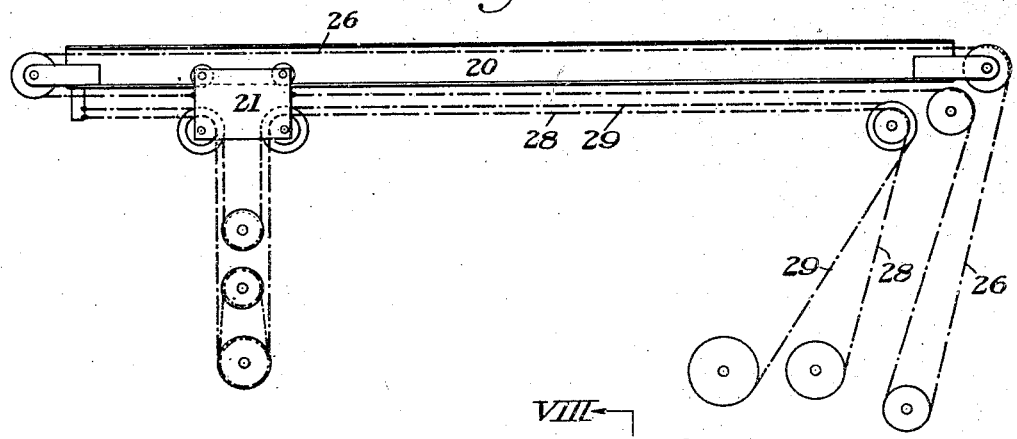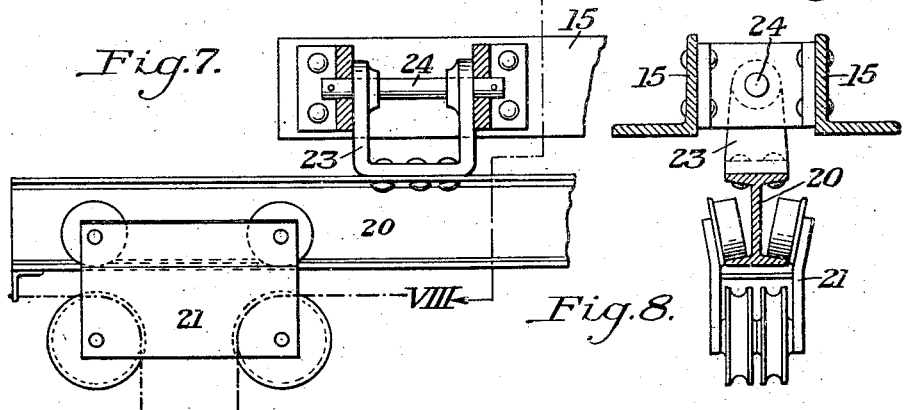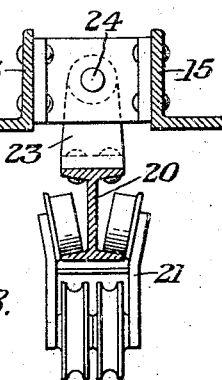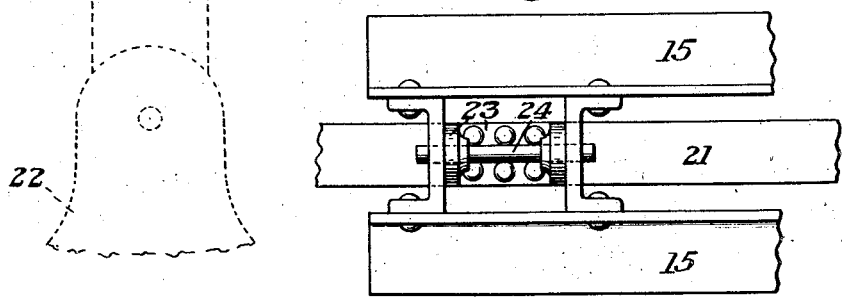

April 13, 1926.
H. ENARD
1,580,556
LOADING AND UNLOADING APPARATUS
Filed Dec. 14, 1922
5 Sheets-Sheet 5
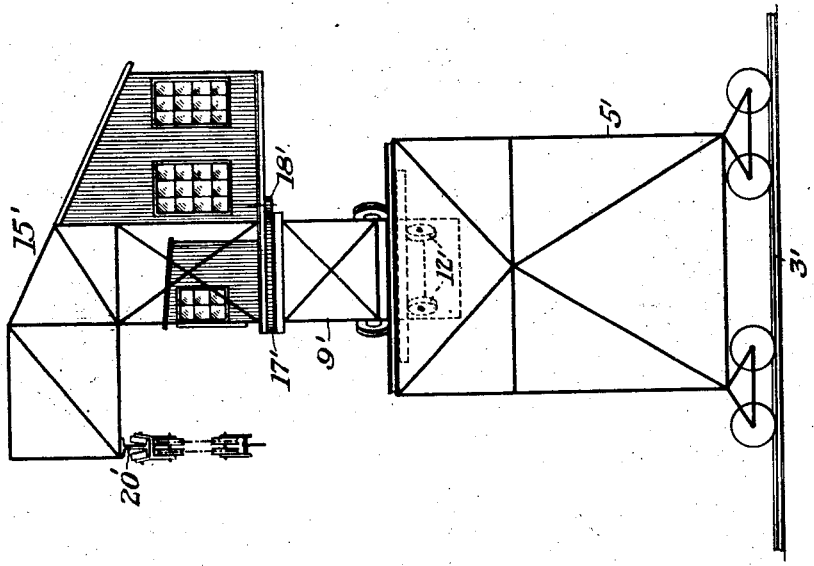
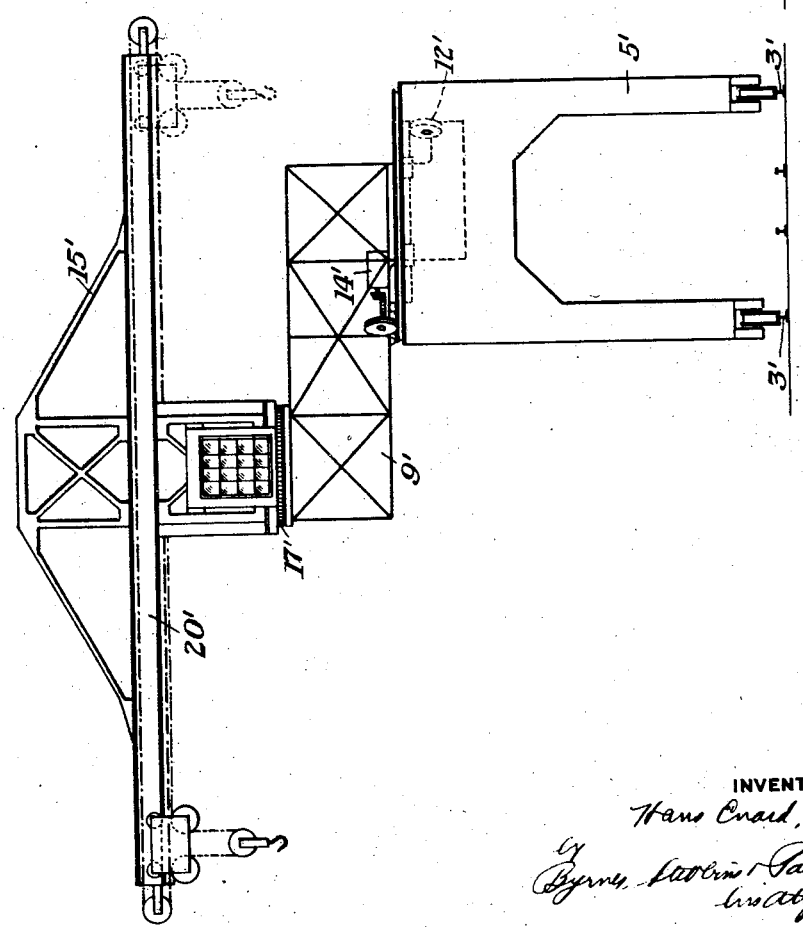
INVENTOR
Hans Enard, Patented Apr. 13, 1926.

1,580,556

UNITED STATES PATENT OFFICE.

HANS ENARD, OF PITTSBURGH, PENNSYLVANIA, ASSIGNOR TO HEYL & PATTERSON, INC., OF PITTSBURGH, PENNSYLVANIA, A CORPORATION OF PENNSYLVANIA.

LOADING AND UNLOADING APPARATUS.

Application filed December 14, 1922. Serial No. 606,80*.

*To all whom it may concern:*

Be it known that I, HANS ENARD, a citizen of the United States, and a resident of Pittsburgh, in the county of Allegheny and State of Pennsylvania, have invented a new and useful Improvement in Loading and Unloading Apparatus, of which the following is a full, clear, and exact description.

The present invention relates broadly to material handling apparatus, and more particularly to an apparatus of this character especially adapted to the loading and unloading of barges, vessels and the like with coal or other material such as is usually handled in bulk.

It has heretofore been proposed to handle material in bulk by systems of conveyors, buckets and the like, but considerable difficulty has usually been experienced in the operation of such apparatus due to the lack of operating flexibility therein. Where grab buckets have been utilized, it has been possible to swing the bucket crane through a complete circle and thereby unload a vessel on one side of the barge carrying the apparatus, and load directly into a vessel on the opposite side of the barge. From a practical standpoint, however, such an operation is so unsatisfactory that usually a vessel is unloaded into a barge, and then the barge in turn is unloaded into the vessel which is to be loaded.

By the present invention, there is provided apparatus of considerable operating flexibility in which the foregoing objections are obviated and by means of which the handling of material in bulk is facilitated.

In the accompanying drawings there are shown, for purposes of illustration only, certain embodiments of this invention, it being understood that the drawings do not define the limits of the invention and that changes in the construction and operation disclosed herein may be made without departing from the spirit or scope of my broader claims.

In the drawings,—

Figure 3 is a diagrammatic top plan view, on an enlarged scale, of the apparatus of Figure 1, the parts being in different relative operating positions;

Figures 4 and 5 are detail views, partly in section, on an enlarged scale, illustrating one of the adjusting mechanisms for the loading trimmer;

Figure 6 is a diagrammatic view illustrating the operating connections for the bucket crane;

Figure 7 is a detail view of a portion of the bucket crane illustrating the pivotal mounting therefor;

Figure 8 is a detail sectional view on the line VIII—VIII of Figure 8;

Figure 9 is a top plan view of the construction shown in Figure 8;

Figure 10 is a side elevation of a slightly modified form of the invention;

Figure 11 is an end view of the construction shown in Figure 10; and

In the loading and unloading of vessels, it is frequently desirable to place the barge carrying the unloading and loading apparatus directly between the vessels. This permits the vessels to be securely held in position with respect to each other and with respect to the barge. The present invention illustrates an apparatus which may be advantageously used in this manner, although it is adapted to other uses where traveling cranes and material handling apparatus are required.

Figure 1:
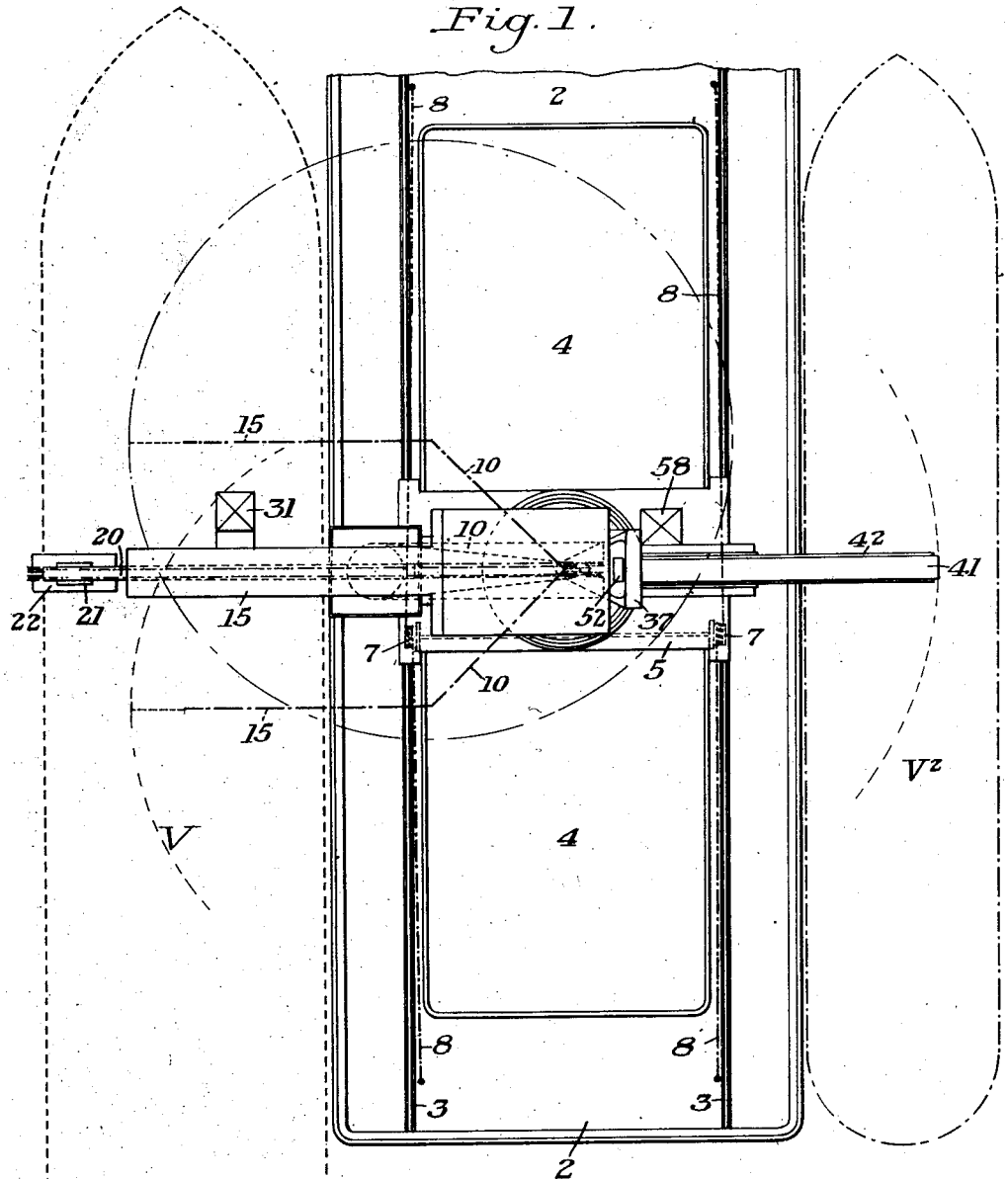
Figure 1 is a top plan view, largely diagrammatic, illustrating one form of apparatus embodying the invention and unloading a vessel on one side of the barge and loading a vessel on the opposite side thereof.
Figure 2:
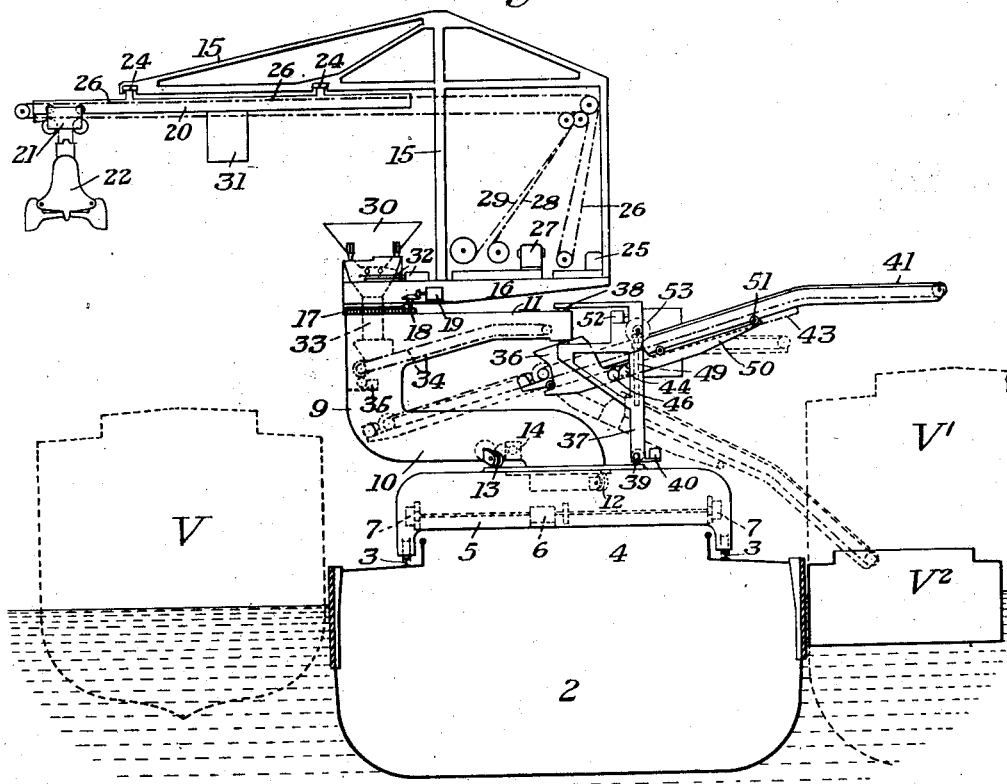
Figure 2 is a side elevation, partly broken away, of the construction illustrated in Figure 1.
Figure 12:
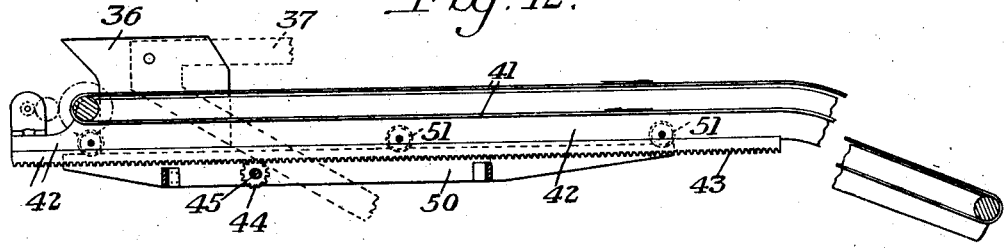
Figure 12 is a detail view of the trimmer conveyor.

In Figures 1 and 2 of the drawings, there is illustrated a barge 2 having longitudinally extending tracks 3 on its deck located on opposite sides of the hatchway 4. Mounted on the tracks 3 is a traveling or portable frame 5. The traveling frame is preferably equipped with a driving mechanism of the rope haulage type. This mechanism may comprise an operating motor 6 carried by the frame and connected to drums 7 which cooperate with the ropes or cables 8 dead-ended adjacent opposite ends of the barge. With this construction, the operation of the motor 6 will be effective for moving the frame in one direction or the other, as may be desired, and at the same time will be effective for preventing sliding of the frame on the track due to any inclination of the deck of the barge. It will be apparent, however, that other forms of propelling mechanisms may be utilized if deemed desirable.

Projecting upwardly from a substantially central portion of the frame 5, is a supporting arm 9. This arm may conveniently be substantially C-shaped, having a lower horizontally extending portion 10 and an upper horizontally extending portion 11. The lower portion 10 is provided with supporting and traction wheels 12 adapted to cooperate with a suitable trackway provided on the under side of the frame 5. It is also provided with a second set of wheels 13 cooperating with a trackway on the upper surface of the frame 5. The wheels 13 may conveniently be utilized as driving wheels by operatively connecting thereto a motor 14, in any well known manner, effective for turning the supporting arm 9 bodily about its bearing in the traveling frame.

Rotatably mounted on the upper portion 11 of the supporting arm is a conveyor or grab bucket crane 15. This crane may comprise a platform 16 extending substantially parallel to the portion 11 and pivotally connected thereto in line with the vertically extending portion of the C-shaped supporting arm. Surrounding the axis of rotation of the bucket crane, is a fixed gear 17 with which meshes a pinion 18 adapted to be driven by a motor 19 on the platform 16 for rotating the bucket crane. This construction permits the crane, in turn, to be rotated to any desired position about its pivotal axis. As the axes of the bucket crane and of the supporting arm are offset one with respect to the other, it will be apparent that the different parts of the apparatus may be moved to a pluraliy of different operating positions and the parts of the mechanism operated while in any of these positions. This insures a considerable degree of flexibility, thereby adapting the apparatus to the loading and unloading of vessels.

Carried by the longer arm and normally outer end of the crane, is a trolley runway 20. This runway, as illustrated more particularly in Figures 6 to 9, may comprise a channel beam of substantially I-shape upon the lower flange of which is adapted to travel a conveyor such as trolley 21 which carries the grab bucket 22. Secured to the upper flange of the beam, and projecting upwardly therefrom, are brackets 23 cooperating with fixed pivots 24 in the bucket crane whereby a relative lateral or swinging movement between the trolley runway and the bucket crane is permitted. This relative movement has been found to be particularly advantageous in eliminating strains from the bucket crane during swinging movements thereof about its pivotal mounting. The shorter and normally inner end of the bucket crane carries a trolley traversing motor 25 adapted to operate the cable 26 in opposite directions in any well known manner for moving the trolley 21 to any position on the trolley runway. The shorter end of the bucket crane also carries a bucket hoisting motor 27 cooperating with the cable 28 for raising and lowering the grab bucket, and with the cable 29 for opening or closing the sections thereof.

The specific construction of the various operating motors may be in accordance with established practice and constitutes no essential part of the present invention other than the cooperation which the respective operating parts may have in the complete apparatus.

Coinciding with the axis of rotation of the bucket crane on the supporting arm, is a hopper 30 adapted to receive the material unloaded by the bucket 22 from the vessel V. In order to permit the operator of the bucket crane to have a full view of all of the parts at any time, irrespective of the relative positions thereof, the cab 31 may conveniently be carried by the bucket crane at one side of and below the trolley runway 20. This permits the operator to observe the action of the bucket 22 in the vessel V and the proper positioning thereof over the hopper 30. This hopper preferably constitutes part of a weighing mechanism 32 of any well known or standard construction by means of which the amount of material being handled may be continuously determined. From the weighing apparatus the material passes through a chute 33 to the lower end of a relatively fixed endless conveyor 34. This conveyor may conveniently be of the endless belt type having its upper run troughed, as is customary in the art, and may be driven by a motor 35 suitably carried by the supporting arm 9. The discharge end of the conveyor 34 is substantially coincident with the axis of rotation of the supporting arm, whereby in any position of the supporting arm relative to the barge 2 the same relative operating conditions between the discharge end of the conveyor and the other parts of the apparatus may be maintained.

For receiving the material from the conthe conveyor system relatively to said crane, said conveyor system including a plurality of hoppers one of which is mounted substantially concentrically to each of said axes of rotation.

3. In a coal handling apparatus a C shaped frame, a supporting frame carried thereby and rotatable about an axis adjacent one side of the frame, an unloading crane carried by said arm and rotatable about a vertical axis adjacent the opposite side of the frame, a conveyor system adapted to receive the discharge from said unloading crane, and means for angularly adjusting the conveyor system relatively to said crane, said conveyor system including a plurality of hoppers one of which is mounted substantially concentrically to each of said axes of rotation.

4. In a material handling apparatus, a frame, a supporting arm rotatably carried thereby, a crane rotatably carried by said arm, said arm and crane respectively being rotatable about axes offset one from the other, means for delivering material from the crane to a fixed point irrespective of the position of the crane, means for receiving material from said point and discharging the same to the point desired, and means for adjusting said last mentioned means vertically, angularly and laterally, with respect to said crane.

5. In a material handling apparatus, a frame, a supporting arm rotatably carried thereby, an unloading crane rotatably carried by said arm, the axis of rotation of the arm and crane being offset, a hopper substantially vertically positioned with respect to each of said axes, a conveyor system cooperating with said hoppers and adapted to receive the discharge from said unloading crane, and means for adjusting the conveyor system relatively to said crane.

6. In a material handling apparatus, a frame, a suporting arm rotatably carried thereby, a bucket crane rotatably mounted on said arm, a relatively fixed conveyor to which said crane is adapted to discharge, and an adjustable trimmer receiving material from said conveyor, said trimmer being vertically, angularly, and laterally adjustable, with respect to said crane, said crane having a control housing thereon.

7. Apparatus for handling material including a rotatable support, an eccentrically disposed hopper thereon, a crane on the support rotatable concentrically to the axis of the hopper, a delivering conveyor having an inner receiving end centrally located with respect to the axis of rotation of the rotatable support, and having an outwardly extending discharge end, and means for transferring material from the eccentric hopper to the receiving end of said delivering conveyor.

8. Apparatus for handling material including a rotatable support, an eccentrically disposed hopper thereon, a crane on the support rotatable concentrically to the axis of the hopper, a delivering conveyor having an inner receiving end centrally located with respect to the axis of rotation of the rotatable support, and having an outwardly extending discharge end, and means for transferring material from the eccentric hopper to the receiving end of said delivering conveyor, said means including a weighing mechanism.

9. Apparatus for handling material including a rotatable support, an eccentrically disposed hopper thereon, a crane on the support rotatable about the axis of the hopper, a delivering conveyor associated with the support and mounted to rotate about the axis of rotation of said support, and movable relatively thereto, said conveyor having a receiving end and a discharge end, means for transferring material from the hopper to the receiving end of the conveyor irrespective of the relative positions of the hopper and the delivering conveyor.

10. Apparatus for handling material comprising a support, a rotatable frame on the support projecting laterally from the support, a crane structure having a horizontal beam rotatably fixed on the outer end of said rotatable frame, and a conveyor on the beam movable longitudinally therealong.

11. Apparatus for handling material comprising a support, a rotatable frame on the support projecting laterally from the support, a crane structure having a horizontal beam rotatably fixed on the outer end of said rotatable frame and a conveyor on the beam movable longitudinally therealong, said beam being supported from the crane structure at intervals along its length on horizontal pivots permitting of a transverse swinging movement of the beam.

12. Apparatus for handling material comprising a support, a rotatable frame on the support projecting laterally from the support, a crane structure having a horizontal beam rotatably fixed on the outer end of said rotatable frame, a conveyor on the beam movable longitudinally therealong, a receiving hopper at the center of rotation of the crane structure, and delivery means associated with the rotatable frame into which material from the hopper is discharged.

13. In a material handling apparatus, a C shaped frame, a supporting arm rotatably carried thereby, a crane rotatably carried by said arm, said arm and crane respectively being rotatable about axes offset one from the other, means including a conveyor in one arm of said frame for delivering material from the crane to a fixed point irrespective of the position of the crane, and means including a conveyor between the arms of said veyor 34, there may be provided a hopper 36 carried by a standard 37. This standard at its upper end is offset and has a pivotal bearing 38 in the inner end of the upper portion 11 of the supporting arm. At its lower end the standard 37 has supporting wheels 39 adapted to travel on the trackway provided on the traveling frame 5 for the wheels 13. This standard may carry a motor 40 connected to the wheels 39 for rotating the standard about its pivotal mounting 38 to any desired angular position. As the supporting arm and the standard both travel on the same trackway on the frame 5, it will be apparent that relatively one to the other neither the supporting arm nor the standard can make a complete revolution, although they may be simultaneously rotated to any desired position.

Passing through the hopper and adapted to receive material therefrom, is a loading trimmer comprising an endless conveyor 41 carried by a frame 42. This frame, as clearly shown in Figure 5, has certain portions thereof shaped to form racks 43, which racks mesh with pinions 44 on a transversely extending shaft 45. This shaft is adapted to be driven by a motor 46, shown in Figure 2, adapted to drive the gear 47.

The shaft 45 is journaled at its ends in a vertically moving frame 48 carried by adjusting screws 49. The frame 48 carries trackways 50 on which travel flanged wheels 51 journaled in the frame 42 and carrying the weight of the frame 42 as the trimmer conveyor is racked from its outer full-line position as illustrated in Figure 2 to its inner dotted-line position, or vice versa.

The vertical adjustment of the frame 48 whereby it may cooperate with a vessel such as V', or a small vessel such as V², is effected by a motor 52 carried by the standard 37. This motor is adapted to drive a worm wheel 53 on a shaft 54 carrying bevel gears 55 meshing with similar gears 56 on the upper ends of the adjusting screws 49. The direct cooperation between the frame 48 and the adjusting screws may be obtained by providing a pivotally mounted nut 57 in each side of the frame 48 for receiving the adjusting screws.

From the foregoing, it will be apparent that there is provided an unloading apparatus which may be bodily moved longitudinally of the supporting structure, which may be bodily rotated as a unit about the traveling frame, and which comprises an unloading device having an independent axis of rotation and a discharging device also independently rotatable, and adjustable both laterally and vertically. All of the different movements may be obtained at any desired time, and the relative positionings of the parts insure a maximum operating flexibility.

For convenience of control, a second operator's cab 58 may be provided for the control of the loading trimmer. It will be understood that if desired an inter-control between the respective operators' cabs may be utilized whereby the possibility of interference in the operation of the respective parts is minimized.

In Figures 10 and 11 there is illustrated a modified form of the invention, in which the frame 5' is adapted to travel on a trackway 3' which may be mounted on a wharf or other structure. The traveling frame carries an arm 9' rotatably supported thereon and movable to different positions by a slew motor 14'. This arm in turn may carry a crane 15' rotatable by means of the annular rack 17' and carrying a trolley runway 20'. In this embodiment, the trolley runway extends substantially equal distances on opposite sides of the pivotal axis for the crane. In this structure, the respective pivotal axes are also offset, whereby the desired operating flexibility of the parts is obtained.

The advantages of the present invention arise from the provision of a material handling apparatus of compact construction having improved operating possibilities, whereby material in bulk may be directly transferred from one vessel into another, or may be transferred from the vessel into the supporting barge and thence into another vessel, as found desirable.

Further advantages arise from the relative mountings between the respective parts of the apparatus whereby relative adjustment thereof is permitted without disturbing the operative relationship therebetween.

I claim:

1. In a coal handling apparatus, a C shaped frame, a supporting frame carried thereby and rotatable about an axis adjacent one side of the frame, an unloading crane carried by said arm and rotatable about a vertical axis adjacent the opposite side of the frame, a conveyor system adapted to receive the discharge from said unloading crane, and means for vertically and angularly adjusting the conveyor system relatively to said crane, said conveyor system including a plurality of hoppers one of which is mounted substantially concentrically to each of said axes of rotation.

2. In a coal handling apparatus a C shaped frame, a supporting frame carried thereby and rotatable about an axis adjacent one side of the frame, an unloading crane carried by said arm and rotatable about a vertical axis adjacent the opposite side of the frame, a conveyor system adapted to receive the discharge from said unloading crane, and means for vertically adjusting frame for receiving material from said point and discharging the same to the point desired.

14. In a material handling apparatus, a C shaped frame, a supporting arm rotatably carried thereby, a crane rotatably carried by said arm, means including a conveyor in one arm of said frame for delivering material from the crane to a fixed point irrespective of the position of the crane, and means including a conveyor between the arms of said frame for receiving material from said point and discharging the same to the point desired.

In testimony whereof I have hereunto set my hand.

HANS ENARD.